United States Patent [19]

Dlugos et al.

[11] 4,031,402
[45] June 21, 1977

[54] STREAM FEED DETECTOR FOR DETECTING DOCUMENT SPACING

[75] Inventors: Daniel F. Dlugos, Huntington; Flavio M. Manduley, Seymour, both of Conn.

[73] Assignee: Pitney-Bowes, Inc., Stamford, Conn.

[22] Filed: Mar. 23, 1976

[21] Appl. No.: 669,530

[52] U.S. Cl. .......................... 250/557; 250/223 R; 198/460
[51] Int. Cl.² ................. G06K 7/015; G06K 15/00
[58] Field of Search ......... 250/557, 222 R, 222 PC, 250/221, 223; 177/1; 198/38, 34, 460; 328/5; 340/259

[56] References Cited
UNITED STATES PATENTS 3,485,339  12/1969  Miller et al. .................. 250/223 R Primary Examiner—Paul L. Gensler
Assistant Examiner—David K. Moore
Attorney, Agent, or Firm—Robert S. Salzman; William D. Soltow, Jr.; Albert W. Scribner

[57] ABSTRACT

For detecting inadequate separation of successive documents (i.e., stream feed) which pass in seriatim through an apparatus, a logic circuit a counter which begins to count when a first document passes a particular point in the apparatus. A flip-flop is set by a signal from a photosensitive element when a second document passes a second predetermined point. In normal operation, a decoder will respond at a fixed count to clear the flip-flop before a third document arrives at the photosensitive element. However, if the photosensitive element output changes again, indicating the third document has reached the second point before the fixed count is attained, a NOR gate connected to the photosensitive element and the flip-flop generates an inadequate separation or stream feed signal.

8 Claims, 3 Drawing Figures

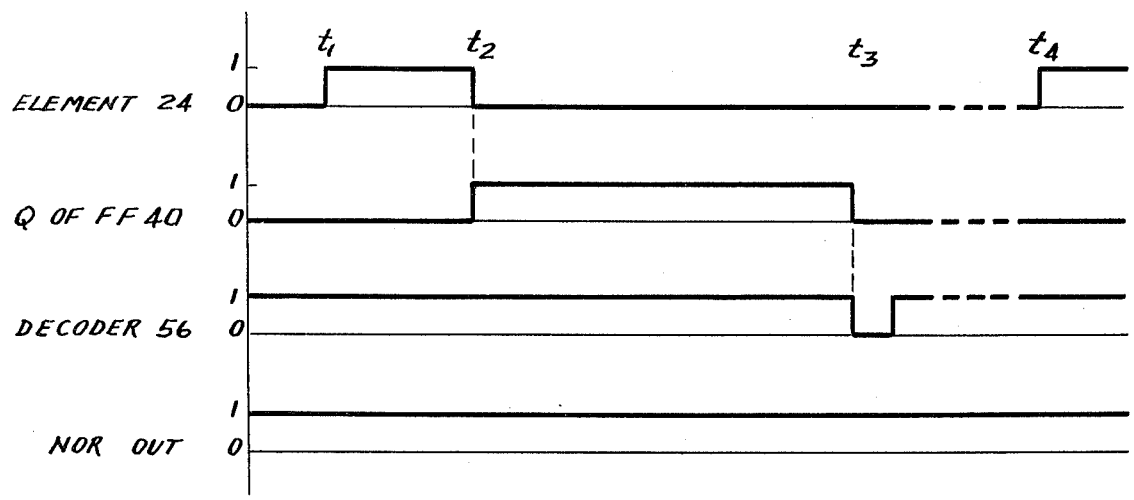
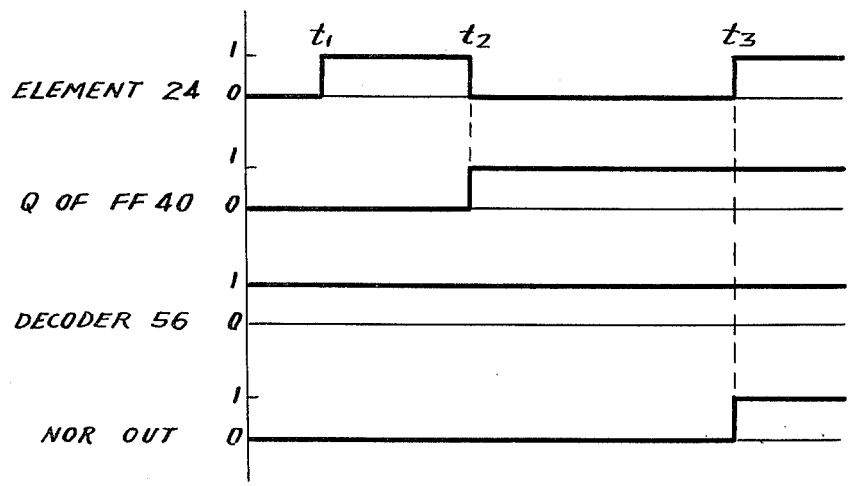

STREAM FEED DETECTOR FOR DETECTING DOCUMENT SPACING

BACKGROUND OF THE INVENTION

The present invention relates to document-handling apparatus and more particularly to a stream feed detector for such apparatus.

In many types of document handling apparatus, such as automatic mailing machines, documents are routed in succession or in seriatim through the apparatus wherein one or more operations are performed on each document. For example, in an automatic mailing machine, envelopes may be automatically weighted, sealed and imprinted with the proper amount of postage before being delivered to a stacker deck from which they will eventually be removed by an operator. Since each of the several operations can be performed on only one envelope at a time, a minimum separation between successive envelopes must be maintained to minimize the risk of jams or operation errors; e.g., the weighing of two envelopes as a single envelope. Failure to maintain the minimum separation is a condition generally referred to as stream feeding.

While stream feeding might be avoided by greatly increasing the intervals between feeding of individual envelopes, this unavoidably reduces the throughput of the apparatus and eliminates one of its primary advantages.

SUMMARY OF THE INVENTION

The present invention is a stream feed detector which monitors the flow of documents passing in seriatim through a document handling apparatus and provides a stream feed signal when inadequate separation between successive documents is sensed.

The detector includes a document detecting means which generates a first level of signal when a document is present at a predetermined point on the flow path and a second level of signal when no document is present. A bistable device is connected to this document detecting means. Where the output of the document detecting means changes from the second level to the first, the bistable device is driven into one state. The detector also includes a timing means which is triggered into operation when a document passes a predetermined point on the path. The timing means provides a signal which clears the bistable device at the end of a predetermined period of time. A logic element is connected to both the document detecting means and to the bistable device. This logic element generates a stream feed signal if the output of the document detecting means returns to the first level before the bistable device is cleared by operation of the timing means.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 2 illustrates signals generated during normal operation of an apparatus incorporating the present invention; and FIG. 3 illustrates signals generated when stream feed occurs within an apparatus incorporating the present invention.

DETAILED DESCRIPTION

Figure 1:
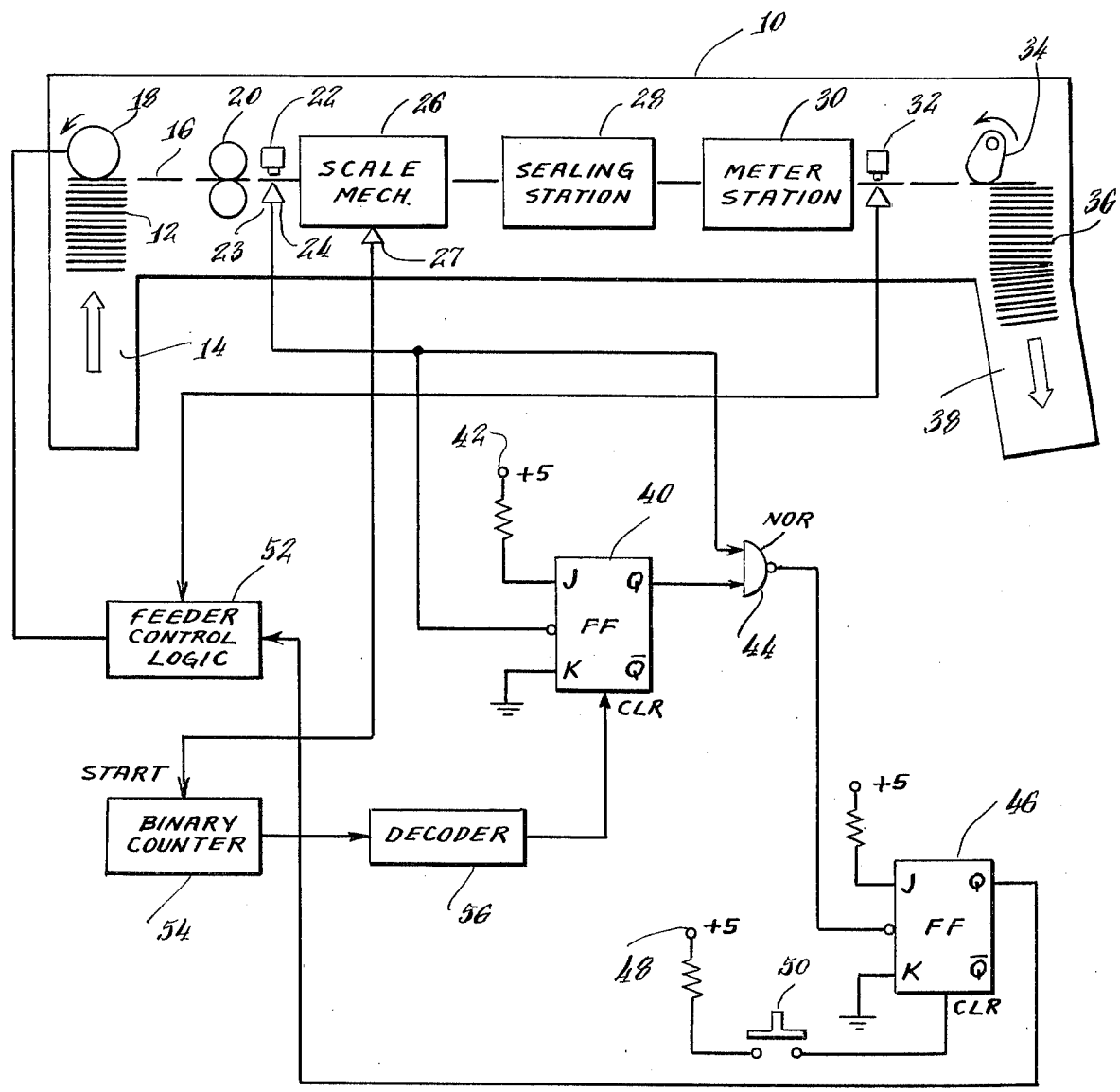
FIG. 1 is a schematic diagram of a circuit constructed in accordance with the present invention.

Referring to FIG. 1, an automatic mailing machine 10 is shown in greatly simplified fashion to illustrate one type of document handling apparatus to which the present invention might be applied. In such a machine, a stack 12 of unmetered and perhaps unsealed envelopes are deposited on a feeder deck 14 by an operator. Envelopes in the stack 12 are accelerated in succession along a flow path 16 by an intermittently-energized roller 18 shown rotating in a counterclockwise direction.

Envelopes on the flow path are directed through a pair 20 of driven rollers and past a document detecting means 23 which, in a preferred embodiment, is a photoelectric system including a light source 22 and a photosensitive element 24 located on opposite side of the flow path 16. This document detecting means is employed in the stream feed detector to be described in more detail below.

Envelopes are then directed to a scale mechanism 26. Scale mechanism 26, which includes an envelope detector 27, automatically weighs each envelope to generate a signal which is processed by the electronic circuitry (not shown) of the machine to determine the proper amount of postage to be imprinted on the envelope. After leaving the scale mechanism 26, envelopes are directed through a sealing station 28 where all previously unsealed envelopes are sealed. The sealed envelopes are directed from sealing station 28 to a metering station 30 where a postal meter imprints the proper amount of postage on each envelope. Envelopes leaving the metering station 30 pass another document detecting means 32 as they are routed to a stacker mechanism.

The stacker mechanism includes an irregularly shaped camming member 34 which rotates in a counter-clockwise direction. During part of each cycle of rotation, a lobe on the rotating camming member 34 impinges on flow path 16, picking up letters emerging from metering station 30 and pushing them into line in a stack 36 of processed envelopes on a stacker deck 38. The processed envelopes remain on the stacker deck until removed by an operator or until the stacker deck is filled. If the stacker deck does become filled, a limit switch automatically shuts down the machine 10 until processed envelopes can be removed.

Since automatic mailing machines, such as the machine generally described above, are a preferred but not the only application of the present invention, no further details of the machine will be provided. Further details of one such machine may be ascertained from U.S. Pat. No. 3,877,531, issued 4/15/75, and assigned to the assignee of the present invention.

The present invention is a stream feed detector which may be employed with any apparatus or system in which a minimal spacing must be maintained between items passing through the apparatus or system to minimize the risk of jams or to assure adequate time for the completion of any operation performed on the individual items. The function of the stream feed detector is to determine when one item is following another too closely and to provide an output signal indicating this condition.

In the context of the automatic mailing machine 10, a stream feed detector includes the photosensitive element 24 and light source 22 of the document detecting means 23. The photosensitive element 24 provides signals to a clock input of a bistable device 40 which, in a preferred embodiment, is a conventional J-K flip-flop. The J input terminal of flip-flop 40 may be tied to a logic level voltage source 42 which provides a constant binary 1 signal. The K input terminal may be tied to ground, which is the equivalent of a binary 0 signal. With the J and K inputs maintained at the specified levels, flip-flop 40 will be driven into a set state when a negative going signal is generated by photosensitive element 24. In the set state, the Q or normal output of flip-flop 40 is at a binary 1 level.

The Q terminal of flip-flop 40 provides one input to a NOR gate 44 having a second input directly from the photosensitive element 24. The output of NOR gate 44 is tied to the clock input of a second J-K flip-flop 46. The J input of flip-flop 46 is maintained at a constant binary 1 level while its K input is held at a binary 0 level. An input to the clear terminal for flip-flop 46 is illustrated as a logic level voltage source 48 in series with a manually-actuated push button 50.

The Q output of flip-flop 46 is connected to feeder control logic 52 which generally controls the feeding of individual envelopes into the automatic mailing machine 10 from feeder deck 14. In one embodiment of the invention, the feeder control logic 52 responds to signals from document detecting means 32 indicating that an envelope has left the metering station 30 on its way to the stacker deck 38. When such a signal occurs, feeder control logic 52 causes roller 18 to be energized accelerating an envelope along the flow path 16.

Binary counter 54 counts through a fixed counting cycle and resets to a zero count condition. The counter is driven from this zero count condition and into the cycle by the arrival of an envelope at envelope detector 27. The duration of the fixed counting cycle is slightly longer than the duration of adequate or greater spacing of normally moving envelopes.

The stream feed detector described above generally operates as follows. Upon the arrival of each envelope at envelope detector 27 in scale mechanism 26, the binary counter 54 is triggered into its counting cycle. When the next envelope reaches document detecting means 23, the output of photosensitive element 24 rises to a binary 1 level. The flip-flop 40 does not trigger on positive-going signals, however, and remains in a previously established cleared state. NOR gate 44, which previously had binary zero signals at both inputs, now has a binary 1 signal at its input from the photosensitive element 24. The output of the NOR gate 44 remains at binary 1 level. As the trailing edge of the envelope passes document detecting means 23, the signal from photosensitive 24 decreases from a binary 1 to a binary 0 level. This negative-going signal at the clock input of flip-flop 40 sets the flip-flop 40, driving its Q output to a binary 1 level. However, since the input to NOR gate 44 from photosensitive element simultaneously decreased to a binary 0 level, the output of gate 44 remains at a binary 1 level.

When the binary counter 54 reaches a predetermined count, which occurs after a fixed period of time since the counter is incremented by a regularly occurring system clock pulse, the decoder 56 produces an output signal which clears or resets flip-flop 40. Under these conditions, both inputs to NOR gate 44 return to a binary 0 level until the next envelope is sensed.

Referring to FIG. 2, the output of photosensitive element 24 is shown increasing to a binary 1 level at a time $t_1$ at which the leading edge of an envelope has reached the document detecting means 23. While one input to NOR gate 44 also rises to a binary 1 level, its output does not change since the second input from cleared flip-flop 40 remains at a binary 0 level.

At time $t_2$ the trailing edge of this envelope clears the document detecting means 23, causing the signal from photosensitive element 24 to fall to a binary 0 level. As a consequence, flip-flop 40 is driven to a set state in which its Q output rises to a binary 1 level. The system remains in this state until a time $t_3$ at which the binary counter 54, triggered into operation by envelope detector 27 prior to $t_1$, produces a negative-going pulse which resets flip-flop 40 to drive its Q output to a binary 0 level. When a second envelope approaches the document detecting means 23 at a later time $t_4$, the increased output from photosensitive element 24 does not produce any change in the output of NOR gate 44 since the flip-flop 40 input to NOR gate 44 was previously cleared to a binary 0 level.

Under these conditions, the constant output from NOR gate 44 does not allow flip-flop 46 to be clocked from its previously-established reset state. As long as successive envelopes are spaced by a predetermined minimal distance, the circuit will continue to operate in the manner described above with the output of NOR gate 44 remaining constant at a binary 1 level and flip-flop 46 remaining in its reset state.

The operation of the circuit under stream feed conditions is described with reference to FIG. 3. The leading edge of a first envelope reaches element 24 at a time $t_1$. The trailing edge of the same envelope clears element 24 at a time $t_2$. At time $t_2$, the negative-going output from element 24 clocks flip-flop 40 into a set state. The stream feed occurs when the leading edge of a second envelope arrives at document detecting means 23 at a time $t_3$ before the decoder 56 generates a clearing signal. Since flip-flop 40 is clocked only on negative-going signals, the increased signal from photosensitive element 24 does not alter the set state of flip-flop 40. Flip-flop 40 continues to produce a binary 1 signal on its Q output terminal.

Since both inputs to the NOR gate 44 go to a binary 1 level beginning at time $t_3$, the output of NOR gate 44 falls to a binary 0 level. The negative going output from NOR gate 44 clocks flip-flop 46 into a set state, causing that flip-flop to apply a binary 1 or stream feed signal to the feeder control logic 52. According to a preferred embodiment of the invention, the stream feed signal is used to disable the feeder mechanism for the automatic mailing machine until the closely following second envelope can be removed from the machine. An operator can then reset the machine and eliminate the stream feed signal by depressing push button 50 to provide a clearing pulse to the flip-flop 46.

While there has been described what is considered to be a preferred embodiment of the present invention, variations and modifications will occur to those skilled in the art once they become acquainted with the basic concepts of the invention. Therefore, it is intended that the appended claims shall be construed as including all such variations and modifications as fall within the true spirit and scope of the invention.

What is claimed is:

1. For use in a object handling device wherein objects are fed in seriatim along a predetermined path, a stream feed detector for detecting inadequate separation of successive objects, said stream feed detector including:
- an object detecting means located on the path at a predetermined point for generating a first level of signal when an object is present and a second level of signal when no object is present;
- a bistable device connected to said object detecting means, said bistable device being driven to one state upon a change from the second level to the first level of signal;
- counting means for clearing said bistable device to a second state at the end of a predetermined period of time;
- means for initiating operation of said timing means when an object is at a second predetermined point on the path; and
- logic means having inputs from said object detecting means and said bistable device for generating an inadequate separation signal if the output of said object detecting means returns to the first level before said bistable device is cleared to the second state.

2. For use in a document handling device wherein documents are fed in seriatim along a predetermined path, a stream feed detector for detecting inadequate separation of successive documents, said stream feed detector including:
- a document detecting means located on the path at a predetermined point for generating a first level of signal when a document is present and a second level of signal when no document is present;
- a bistable device connected to said document detecting means, said bistable device being driven to one state upon a change from the second level to the first level of signal;
- counting means for clearing said bistable device to a second state at the end of a predetermined period of time;
- means for initiating operation of said counting means when a document is at a second predetermined point on the path; and
- logic means having inputs from said document detecting means and said bistable device for generating an inadequate separation signal if the output of said document detecting means returns to the first level before said bistable device is cleared to the second state.

3. A stream feed detector as recited in claim 2 wherein said document detecting means comprises a photoelectric device having a light source on one side and a photosensitive element on the other side of the predetermined path, said photosensitive device producing the first level of signal when a document is interposed between it and the light source and the second level of signal when no document is interposed.

4. A stream feed detector as recited in claim 2 wherein said counting means comprises a binary counter and a decoder connected to the output stages of said counter to provide a clearing signal to said bistable device at a predetermined binary count.

5. A stream feed detector as recited in claim 3 wherein said counting means comprises a binary counter and a decoder connected to the output stages of said counter to provide a clearing signal to said bistable device at a predetermined binary count.

6. A stream feed detector as recited in claim 4 wherein said logic means comprises a dual-input NOR gate which produces a binary zero signal if and only if both inputs are at a binary one level.

7. A stream feed detector as recited in claim 5 wherein said logic means comprises a dual-input NOR gate which produces a binary zero signal if and only if both inputs are at a binary one level.

8. For use in a document handling device wherein documents are fed in seriatim along a predetermined path, a stream feed detector for detecting inadequate separation of successive documents, said stream feed detector including:
- a photoelectric device comprising a light source and a photosensitive element at a predetermined point on the path, said photosensitive element producing a binary one level signal when a document intercepts the light beam directed from the source to the element and a binary zero level signal when the light beam is not intercepted;
- a flip-flop having an output and a trigger input connected to the output of said photosensitive element, said flip-flop being driven to a set state wherein the output carries a binary one level signal when the signal at the trigger input goes from a binary one level to a binary zero level;
- a counter;
- means for causing said counter to begin counting when a document is at a second predetermined point on the path;
- a decoder connected to said counter for providing a clearing signal to said flip-flop at a predetermined count, the clearing signal serving the drive said flip-flop into a reset state wherein its output carries a binary zero level signal; and
- a NOR gate having inputs from said photosensitive element and the output of said flip-flop for generating an inadequate separation signal if the output of the photosensitive element returns to a binary one level, indicating the leading edge of another document has reached the element, before said flip-flop is reset by the clearing signal produced by said decoder.

* * * * *